United States Patent [19]

Mehalso

[11] 4,018,945
[45] Apr. 19, 1977

[54] METHOD OF MAKING A METALLIZED VIDEO DISC HAVING AN INSULATING LAYER THEREON

[75] Inventor: Robert Michael Mehalso, Trenton, N.J.

[73] Assignee: RCA Corporation, New York, N.Y.

[22] Filed: June 19, 1975

[21] Appl. No.: 588,387

[52] U.S. Cl. .......................... 427/41; 179/100.1 B; 179/100.4 R; 204/168; 358/128
[51] Int. Cl.² ..................... B05D 3/06; G11B 3/70; G11B 25/04
[58] Field of Search ..................... 178/6.6 R, 6.6 A; 427/39, 40, 41; 204/165, 168; 179/100.1 B, 100.4 R

[56] References Cited

UNITED STATES PATENTS

| 3,309,221 | 3/1967 | Smith | 427/39 |
| 3,457,156 | 7/1969 | Fisher | 427/39 |
| 3,666,533 | 5/1972 | Lee | 427/41 |
| 3,842,217 | 10/1974 | Clemens | 179/100.1 B |
| 3,901,994 | 8/1975 | Mehalso et al. | 427/39 |
| 3,944,709 | 3/1976 | Levy | 427/41 |

*Primary Examiner*—John H. Newsome
*Attorney, Agent, or Firm*—Glenn H. Bruestle; Birgit E. Morris

[57] ABSTRACT

A polymeric film applied to a video disc by glow discharge techniques is treated with a subsequent glow discharge in air to improve wear properties.

4 Claims, No Drawings

METHOD OF MAKING A METALLIZED VIDEO DISC HAVING AN INSULATING LAYER THEREON

This invention relates to an improved method of making video discs. More particularly, this invention relates to a post-treatment of a dielectric film on the video disc to improve wear properties.

BACKGROUND OF THE INVENTION

U.S. Pat. No. 3,842,194 to Clemens describes a video recording and playback system whereby conductive disc replicas can be prepared having geometric variations in the bottom of a spiral groove in the disc surface which is representative of video information. The conductive discs are coated with a thin dielectric coating. During playback, a metal stylus, riding upon the dielectric coating, detects the dimensional variations in the groove as capacitance variations which can be electrically processed to recreate electrical signals representative of the recorded video information.

U.S. Pat. No. 3,843,399 discloses one method of applying the dielectric coating. According to this method, a thin, uniform, conformal dielectric film is applied by a glow discharge technique in a vacuum chamber. Small amounts of a dielectric or dielectric polymer precursor are fed to the chamber and a potential is applied so as to cause a glow in the chamber in the vicinity of the disc, in turn causing a dielectric film to form on the disc. When styrene is employed as the film-former, a tough, adherent coating of a polymer of styrene forms on the disc.

The dielectric in turn can be coated with a lubricant film to further improve the playback quality of the disc. Lubricant films of methyl alkyl siloxanes are disclosed in U.S. Pat. No. 3,833,408.

Although the above method is rapid and good quality films are obtained which have good wear properties, it has been found that these films deteriorate on standing. Thus, although a styrene polymer film on a video disc can be played back from 50-100 times without noticeable deterioration shortly after fabrication, upon standing for 1 to 3 months, the films deteriorate so that after only 10 to 20 plays the record wear becomes apparent. Thus it is desired to improve the long-term resistance of such dielectric films to deterioration.

SUMMARY OF THE INVENTION

I have discovered that the long-term resistance to deterioration of films of a dielectric polymer applied by glow discharge to a video disc can be improved by post treatment of the films to a glow discharge in the presence of an oxygen-containing gas.

DETAILED DESCRIPTION OF THE INVENTION

According to the present method, a conductive video disc is mounted in a vacuum chamber, parallel to but separate from, a second conductive disc. The discs act as the electrodes during deposition of the dielectric film on the video disc. Electrical connections are contacted to the disc and connected to a source of current. The chamber is evacuated, preferably to a pressure of about 10–20 microns, and a sufficient amount of the film precursor, e.g., styrene, is fed into the chamber so as to deposit the desired amount or film thickness of the resultant dielectric polymer on the disc. The monomer pressure can be from about 10–2000, preferably 50–300, microns. Alternatively, a continuous flow of monomer can be charged to the vacuum chamber until the desired film thickness is obtained on the video disc.

A potential is then applied to the disc so as to cause a glow between the electrodes. Preferably the current is 60 cycle alternating current due to its ready availability, but high frequency current up to about 135 megacycles or direct current can also be employed.

After the desired amount of dielectric film has been applied to the video disc, and in the absence of a lubricant film, the surface is post treated with a glow discharge in the presence of an oxygen-containing gas to improve the wear properties of the dielectric film.

In a batch type process, the present process can be carried out by evacuating the chamber, feeding in the desired amount of dielectric film precursor and air, water or other oxygen-containing gas, and sealing the chamber. The glow discharge is then initiated and maintained for a period sufficient both to exhaust all of the film forming material present and to post treat the deposited film with a glow discharge.

In a continuous type process, when a continuous stream of dielectric precursor is fed to an evacuated chamber, the disc is moved into place, glow discharge initiated and maintained for a time sufficient to deposit the amount of film desired, the disc is transferred to another chamber containing a small amount of air or other oxygen-containing gas and glow discharged again to treat the deposited dielectric film. Other variations will be apparent to one skilled in the art.

Although the exact nature of all of the changes in the properties of the dielectric film are not known, the glow discharge treatment does impart energy to the surface of the film so that its contact angle is decreased, preferably below about 30°. This should also improve the adhesion of a lubricant film on the dielectric coating if employed.

The invention will be illustrated further by the following example but it is to be understood that the invention is not meant to be limited to the details described therein.

EXAMPLE 1

A grooved 12 inch (30.5 centimeters) video disc fabricated according to the method of Clemens, U.S. Pat. No. 3,842,194 and having a thin (500 angstroms) layer of gold thereon was mounted in a vacuum chamber fitted with another 12 inch (30.5 centimeters) diameter aluminum disc, such that the two discs were parallel and spaced about 2 to 3 centimeters apart. One electric lead from each disc was connected to a source of potential such that the conditions of glow discharge were: voltage, 380 volts; current, 70 milliamperes; and frequency, 60 Hertz. The chamber was evacuated to a pressure of about 10 microns, styrene was fed into the chamber to a partial pressure of about 130 microns and air was fed into the chamber to a partial pressure of about 500 microns.

Glow discharge was effected for 60 seconds. About 27 seconds was required to exhaust all of the monomer and deposit the polymer film. Thus the film was post-glow discharged for about 33 seconds. The contact angle of water on the resultant styrene polymer surface was 20°.

Several other video discs were glow discharged for only 27 seconds as a control. The contact angle of water on the surface of these discs was 80°.

Numerous video discs and control discs were coated with a methyl alkyl siloxane lubricant film, SF 1147-50 centistokes viscosity commercially available from the General Electric Company according to the method described in U.S. Pat. No. 3,833,408.

One group was tested soon after fabrication. Those that were not post-glow discharged gave unacceptable pictures after an average of about 100 plays, whereas those that were treated to a post-glow discharge could be played over 1000 times without noticeable deterioration of the records.

Another group was tested after storage for two months. Those that were not post-glow discharged gave unacceptable pictures after an average of about 10 plays, whereas those that were treated to a post-glow discharge could be played over 250 times without noticeable deterioration of the records.

A third group was tested by playing back under conditions of high temperature, 100° F., and high relative humidity, 90%. Video discs that were not treated to a post-glow discharge could not be acceptably played back under such conditions, whereas post-glow discharge treated discs could be played at least 15 times under these conditions without noticeable wear.

I claim:

1. In the method of making an information record comprising a disc having a spiral groove in a surface thereof, said groove containing an information track constituted by geometric variations within said groove coated with a first layer of a conductive metal and a second layer of a dielectric material which is applied by glow discharging said metal coated disc in the presence of a polymeric precursor, the improvement which comprises glow discharging said applied dielectric layer in the presence of an oxygen-containing gas.

2. The method according to claim 1 wherein said polymeric precursor is styrene.

3. The method according to claim 1 wherein said applied dielectric coating is glow discharged in the presence of air.

4. The method according to claim 1 wherein said applied dielectric coating is glow discharged in the presence of water vapor.

* * * * *